Jan. 20, 1953     O. A. JOHNSON     2,625,833

GENEVA MECHANISM

Filed Dec. 31, 1949

INVENTOR.
OLAF A. JOHNSON
BY *Schlesinger*
Attorney

Patented Jan. 20, 1953

2,625,833

UNITED STATES PATENT OFFICE 2,625,833

GENEVA MECHANISM

Olaf A. Johnson, Irondequoit, N. Y., assignor to Gleason Works, Rochester, N. Y., a corporation of New York Application December 31, 1949, Serial No. 136,210

3 Claims. (Cl. 74—436)

The present invention relates to mechanisms for producing intermittent rotary motion, and more particularly to mechanism of the Geneva type for this purpose.

Geneva mechanisms are quite extensively used for indexing purposes because in such mechanisms the driver may rotate continuously at a uniform velocity while the driven member or Geneva wheel is actuated only intermittently. In the conventional Geneva mechanism, however, locking of the driven member against rotation, during the periods it is supposed to remain stationary, is achieved by engagement of a peripheral portion of the driver with a peripheral portion of the driven member. This method of locking is not entirely satisfactory and difficulties are often experienced in holding the driven member against rotation during those periods when it and the part of the machine, to which it is secured, are supposed to remain stationary. Moreover, since locking is effected at the peripheries of driving and driven members, drive and driven shafts must be spaced radially far enough apart to allow such locking.

One object of the present invention is to provide an improved type of Geneva mechanism in which the driven member will be locked securely against rotation during those periods when it is supposed to remain stationary.

Another object of the invention is to provide an improved type of Geneva mechanism which will be more compact than conventional forms of such mechanism, but which at the same time will be simple in construction and easy to manufacture.

Other objects of the invention will be apparent hereinafter from the specification and from the recital of the appended claims.

Figure 1:
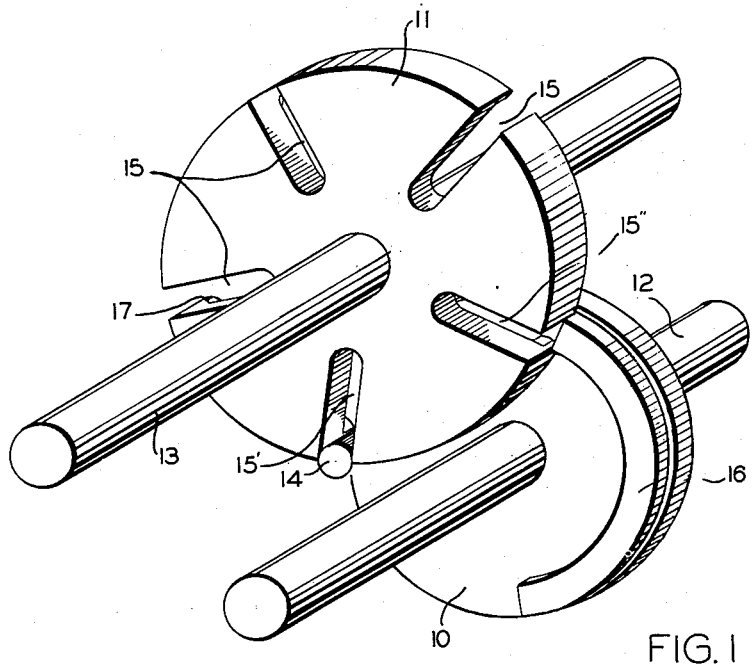
Fig. 1 is a perspective view of an intermittent motion mechanism built according to one embodiment of this invention.
Figure 2:
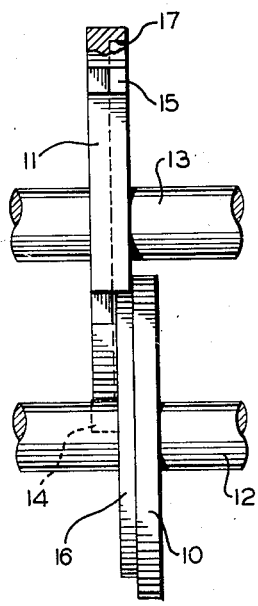
Fig. 2 is a side elevation of this mechanism with a part broken away and shown in section.
Figure 3:
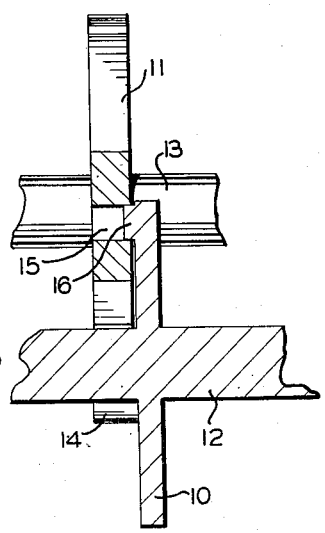
Fig. 3 is a sectional view taken in an axial plane of the driving member and showing the parts during the stage when the driven member is locked against rotation.

Referring now to the drawings by numerals of reference, 10 denotes the disc-like driver and 11 the disc-like driven member of the mechanism. The driver 10 is secured to or integral with a continuously rotating shaft 12. The driven member 11 is secured to or integral with a driven shaft 13 which is adapted to be rotated intermittently. The driver has a pin 14 disposed approximately at its periphery and projecting axially from one face of this disc.

The driven disc 11 is provided with five equiangularly spaced radial slots 15. As the drive shaft 12 rotates continuously, the pin 14 carried by the driver 10 enters each slot 15 of the driven disc 11 successively to intermittently rotate the driven disc and shaft 13.

To hold the driven member stationary during the periods when the pin 14 is out of engagement with the driven member, an arcuate ridge 16 is provided around part of the periphery of disc 10. This ridge projects axially from the same face of the disc 10 from which the pin 14 projects and is concentric with the axis of disc 10. The pin 14 is positioned equi-distantly between the ends of this ridge. The driven disc 11 is formed with a down-turned flange 17 which extends all the way around the periphery of the disc except where it is interrupted by the slots 15. The ridge 16 is adapted to engage at opposite sides with the end faces of the portions of the flange 17 which bound a slot 15 during the periods when the driven member 11 is supposed to be stationary. Thus the driven member is intermittently locked by interengagement of ridge 16 and flange 17 against rotation. The flange 17 is of much less radial thickness than the length of the slots, so that the portions of the flange, which are in axial alignment with the sides of the slots 15 and which constitute, in effect, extensions of said sides, are, therefore, of much less radial length than the slots 15. Thus, the ridge 16 can easily clear the flange 17 as the driver rotates in engagement with the driven member.

If I assume that the driver 10 is rotating in a counterclockwise direction, as viewed in Fig. 1, then the pin 14 is about to leave the slot 15″ with which it has been engaged and is about to cease driving contact with the driven member. The ridge 16 is also about to enter into engagement with the next succeeding slot 15″. When the pin 14 leaves off driving engagement with the driven disc 11, then the ridge 16 comes into locking engagement with that disc. As the driver 10 continues to revolve, then, the ridge 16 revolves in engagement first with the portions of the flange 17, which bound the sides of the slot denoted at 15″, and then with the portions of the flange 17, which bound the sides of the slot denoted at 15′. As long as the ridge 16 is in engagement with these flange portions of the disc 11, then, the disc 11 cannot rotate. When the leaving end of the ridge 16 is rotating out of engagement with the portions of the flange 17 which bound the sides of the slot 15′, the pin 14 will have rotated, through the continued rotation of the disc 10, into position to enter the slot 15″ and begin to drive the driven member 11 again.

The angular extent of the ridge 16, the angular distance through which the ridge revolves in engagement with the different portions of flange 17 per index, and the angular distance through which the disc 11 travels per index depend among other things upon the relative positions of a line drawn radially of axis 10 through the center of pin 14 and of the radial center line of a slot 15 of disc 11 when the pin begins to engage the slot. In the embodiment of the invention shown, when the parts are in the position shown in Fig. 1, the radial center line of slot 15' is approximately perpendicular to a line connecting the center of pin 14 with the axis of disc 10.

With the mechanism of the present invention, the driven wheel 11 will be positively held against rotation during the whole period when the pin 14 is out of driving contact with the wheel. An intermittent drive mechanism made according to the present invention, moreover, is more compact than the conventional Geneva mechanism since locking is achieved by parts lying within the peripheries of both driving and driven members, and the driven wheel can overlap the driver as clearly shown in the drawings.

A further feature of the present invention is that it permits indexing the driven shaft through different angles whereas in the conventional Geneva mechanism, the Geneva wheel is rotated through an angle of 90° per index.

While the present invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention relates and as may be applied to the essential features hereinbefore set forth and as fall within the scope of the invention or the limits of the appended claims.

Having thus described my invention, what I claim is:

1. A mechanism for producing intermittent rotary motion comprising a rotating driving member and a rotary driven member, said driven member having a plurality of radially extending slots, said driving member having an arcuate rib projecting axially from one face thereof and a pin projecting axially from said same face, said rib being concentric to the axis of the driving member and extending part-way only around the axis of the driving member, said pin being adapted to engage in and pass through said slots successively to drive the driven member, and said driven member having portions projecting axially from one face in axial alignment with the sides of the slots but extending for only part of the radial length of such slots, said portions engaging opposite sides of said rib successively during rotation of said driving member to hold the driven member intermittently against rotation, said driving and driven members being so positioned relative to one another that the path of said pin is radial of the axis of the driven member at the moments of entry of the pin into and departure of the pin from a slot of the driven member.

2. A mechanism for producing intermittent rotary motion comprising a rotating driving member and a rotary driven member, said driven member having a plurality of radially extending slots, said driving member having an arcuate rib projecting axially from one face thereof and a cylindrical pin projecting axially from said same face, said rib being concentric to the axis of the driving member and extending part-way only around the axis of the driving member, said pin being adapted to engage in and pass through said slots successively to drive the driven member, said driven member having an axially projecting flange portion extending around its full periphery which has a plurality of radial slots therein, each of which is aligned axially with one of the first-named slots and each of which has one side, at least, aligned with and constituting an axial extension of the aligned corresponding side of one of the first-named slots, said flange being of less radial length than the radial length of said first-named slots, and said one side of each of the last-named slots engaging one side of said rib to hold the driven member intermittently against rotation in one direction during rotation of said driving member, said driving and driven members being so positioned relative to one another that the path of said pin is radial of the axis of the driven member at the moments of entry of the pin into and departure of the pin from a slot of the driven member.

3. A mechanism for producing intermittent rotary motion comprising a rotating driving member and a rotary driven member, said driven member having a plurality of slots that have parallel plane sides, each of which slots extends through the disc from side to side thereof and is radial of the axis of the disc, said driving member having a single arcuate rib projecting axially from one face thereof and a cylindrical pin projecting axially from the same face, said rib being concentric to the axis of the driving member, said pin being adapted to engage in and pass through said slots successively to drive the driven member, said driven member having an axially projecting flange portion extending around its full periphery which has a plurality of plane-sided radially extending slots therein, each of said last named slots being aligned axially with one of the first-named slots, and the sides of the last-named slots constituting axial extensions of the sides of the first-named slots but being of less radial length than the aligned sides of the first-named slots, the sides of the last-named slots engaging opposite sides of said rib to hold the driven member intermittently against rotation during rotation of said driving member, said driving and driven members being so positioned relative to one another that the path of said pin is radial of the axis of the driven member at the moments of entry of the pin into and departure of the pin from a slot of the driven member.

OLAF A. JOHNSON.

REFERENCES CITED

The following references are of record in the file of this patent:

UNITED STATES PATENTS

| Number | Name | Date |
|---|---|---|
| 300,871 | Kaiser | June 24, 1884 |
| 1,097,776 | Swift, Jr. | May 26, 1914 |
| 1,473,493 | Michetti | Nov. 6, 1923 |
| 2,345,139 | Martin | Mar. 28, 1944 |

FOREIGN PATENTS

| Number | Country | Date |
|---|---|---|
| 61,752 | Switzerland | July 8, 1912 |